Sept. 3, 1935.                A. H. OELKERS                2,013,007
                                 TRUCK
                           Filed Oct. 2, 1931          2 Sheets-Sheet 1
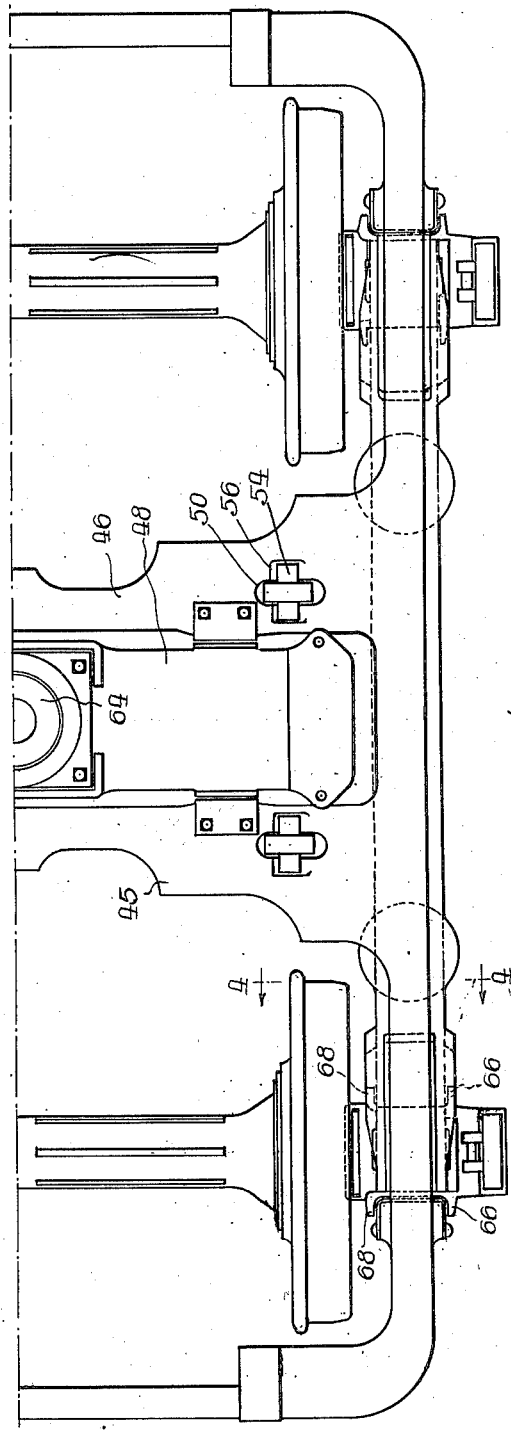
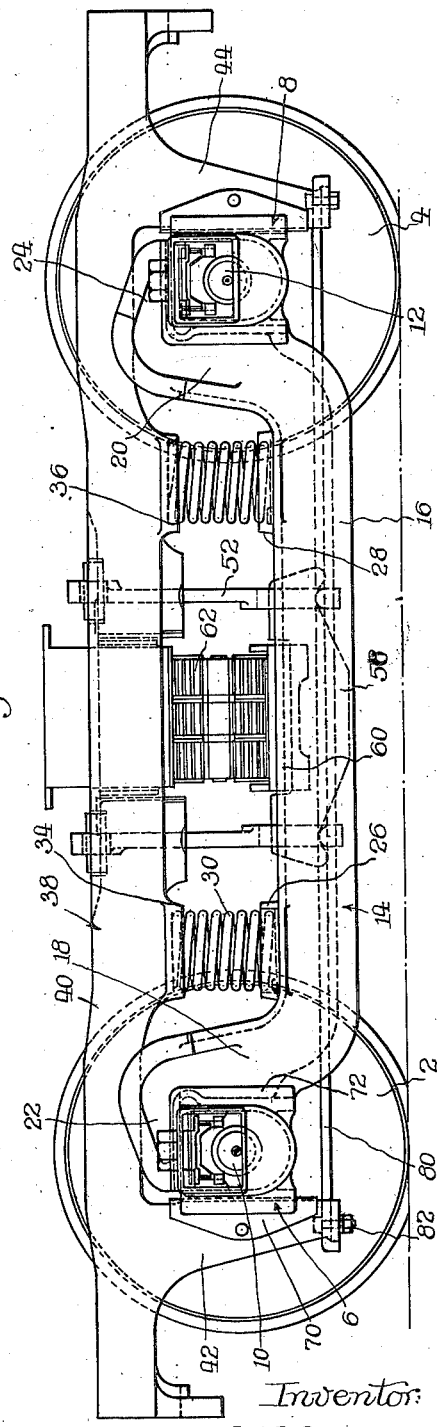
Inventor:
Alfred H. Oelkers, Sept. 3, 1935. A. H. OELKERS 2,013,007
TRUCK
Filed Oct. 2, 1931 2 Sheets-Sheet 2
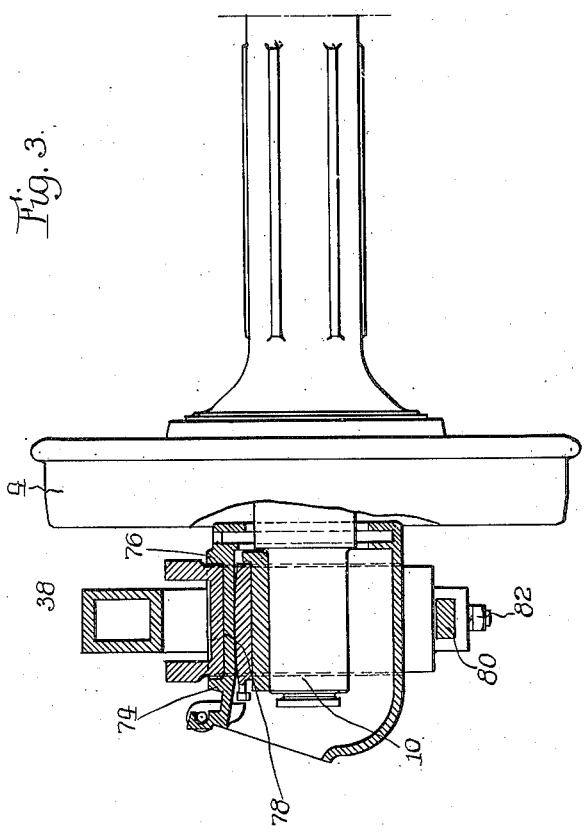
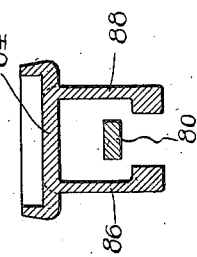
Inventor:
Alfred H. Oelkers,
Wilkinson, Huxley, Byron & Knight
Attys.

Patented Sept. 3, 1935

2,013,007

UNITED STATES PATENT OFFICE 2,013,007

TRUCK

Alfred H. Oelkers, Chicago, Ill., assignor to American Steel Foundries, Chicago, Ill., a corporation of New Jersey Application October 2, 1931, Serial No. 566,473

12 Claims. (Cl. 105—194)

The present invention relates to railway car trucks and more in particular to car trucks including equalizers.

Among the objects of the present invention is to provide a novel truck construction wherein a substantial reduction in the number of wearing parts has been effected, thereby simplifying the construction and reducing the cost of maintenance, repair and replacement.

Another object of the present invention is to provide a novel truck construction having a main frame and equalizers, in which the equalizers are so arranged in relation to the main frame and other parts of the assembly that a far better distribution of the metal resisting stresses and strains may be effected, thus increasing the strength of the truck and its adaptability to hard usage.

The invention comprehends the idea of providing a car truck construction including a main frame having equalizers associated therewith so as to receive loads therefrom, in which tie means is provided between certain portions of the main frame and extending below the equalizers to be in a position to support the equalizers, should the same fail for any reason, and to prevent the same from dragging, a condition which would generally cause a derailment of the truck.

Still another object within the purview of the invention is to provide a car truck construction in which the journal boxes thereof are provided with guide flanges having cooperative guiding relation with portions of a main frame and equalizers included in the truck assembly, the equalizers having seating engagement with these journal boxes, while the main frame has wearing engagement therewith.

The invention further includes the idea of providing a journal box for these trucks of symmetrical construction and provided with guiding flanges adapted to cooperate with the seating portion of the equalizers so as to hold the journal boxes in a definite position. These flanges are further symmetrically constructed for cooperation with the main frame and equalizers so that when the boxes of a front wheel and axle assembly have become worn by contact with the main frame, the same may be interchanged with the boxes of the rear wheel and axle assembly, which in effect increases the usefulness of the boxes and provides for a double wear period before the same have to be replaced or the wearing surfaces restored.

Still another object of the present invention is to provide a novel car truck including the above identified features in a construction comprising equalizers upon which a main frame is resiliently supported, a bolster being resiliently supported and hung between transom portions of the main frame.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a railway car truck embodying the present invention;

Figure 2 is a view in side elevation of the truck disclosed in Figure 1 of the drawings;

Figure 3 is a fragmentary detached end view of one of the wheel and axle assemblies of the car truck construction shown in Figure 1 of the drawings and disclosing the journal box and members of the truck frame associated therewith in vertical cross section, and Figure 4 is a vertical cross-sectional view through the equalizer of the truck construction and taken in a plane represented by line 4—4 of Figure 1 of the drawings.

Referring now more in detail to the drawings, an embodiment of the present invention is disclosed as comprising spaced wheel and axle assemblies 2 and 4 having journal boxes 6 and 8 mounted upon the outer ends of the axles 10 and 12 thereof, respectively. An equalizer 14 comprising a lower elongated tension member 16 is provided with upwardly extending arms 18 and 20 having jaw or seating portions 22 and 24 seating with the journal boxes 6 and 8 at each side of the wheel and axle assemblies 2 and 4. Each of the equalizers 14 is provided with spring seats 26 and 28 positioned adjacent the upwardly extending frame portions 18 and 20, the same being adapted to support the lower end of coil springs 30 and 32 associated with a main frame 38.

This main frame 38 comprises elongated side frame members 40 having depending pedestals 42 and 44 adjacent its ends adapted to have cooperative relation with the journal boxes 6 and 8 of the wheel and axle assemblies 2 and 4, respectively. The elongated side portions 40 of the main frame 38 are connected together by the portions 45 and 46 of a transom between which is disposed a bolster 48. Each of the members 44 and 46 is provided with an opening 50 adjacent each end thereof through which extends a hanger link 52 provided with trunnions 54 received in recessed portions 56 provided adjacent the openings 50. A supporting member 58 is suspended by and between the links 52 at each end of the transom and are adapted to provide a support or seat for a spring plank 60 extending between the equalizers 14 and upon which are the leaf spring assemblies 62 for resiliently supporting the bolster 48 and for transferring the loads from the center bearing 64 thereof to the main frame and thence by way of the coil springs 30 and 32 to the equalizers 14 and the wheel and axle assemblies 2 and 4.

Each of the journal boxes 6 and 8 of the present construction are formed with spaced flanges 66 and 68 on the side thereof, one pair of flanges cooperating with the guide portion 70 of the pedestal of the main frame, for guiding the pedestals in their movement relative to the journal boxes, while another pair of flanges 68 on the other side of the journal box has cooperative relation for receiving the vertical portion 72 of the equalizers. The journal boxes are of symmetrical construction and the flanges 66 and 68 on the sides thereof are of like construction for a purpose to be hereinafter more fully set out.

The journal boxes 6 and 8 are further provided with the spaced flanges 74 and 76 on the upper or top surface thereof so as to provide a depressed portion 78 adapted to receive the seating portions 22 and 24 of the equalizers 14 and to closely fit the same so that the journal boxes are held in substantially a definite position.

As hereinbefore indicated, the flanges 66 and 68 on the sides of the journal boxes are of similar construction, for effecting a definite result. It will be seen from the truck arrangement that substantially no wear occurs between the vertical portions 72 of the equalizers and the side of the journal boxes cooperating therewith, while considerable wear takes place between the guide portions 70 of the main frame and the journal boxes on this side due to the relative up and down movement between the main frame and journal boxes. Inasmuch as the journal boxes are of symmetrical construction, the journal boxes of the front wheel and axle assembly 2 may be interchanged with the journal boxes of the rear wheel and axle assembly 4 when considerable wear has taken place on this referred to side of the journal boxes, this interchangeability exposing the opposite side of the journal boxes to the wear experienced between the same and the pedestals of the main frame, thereby subjecting these boxes to two wear periods instead of one. When the same have become worn on both sides, it is then necessary to either replace the same or have the wear surfaces restored.

The invention further comprehends a novel arrangement or association of the equalizers 14 with the main frame 38 whereby the possibility of derailment of the truck is practically eliminated. The equalizers 14 are immediately below or beneath the elongated portions 40 of the main truck frame 38 and would be supported if the same failed for any reason by a tie rod 80 beneath the same and extending between and connected to the lower end of the pedestals 42 and 44, as by means of bolts 82, or the like. This tie member 80 is disposed beneath the upper web 84 of the elongated portion 16 of the equalizer and between the side flanges or webs 86 and 88. If an equalizer in the truck breaks, the same will immediately sag, thereby permitting the portion 16 supporting the spring coils 30 and 32 to come down until the main frame of the truck rests on the top of the journal box. The tie member 80 is so located in relation to the equalizer 14 that if the broken equalizer sags beyond the point where it has transferred the load of the main frame directly to the journal box, then the tie bar 80 will support the broken equalizer a sufficient height above the railroad track ties to prevent dragging of the equalizer.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a railway car truck, the combination of spaced wheel and axle assemblies provided with journal boxes, said journal boxes being provided with similar guide portions on each side thereof, equalizers between said assemblies and having seating engagement with said journal boxes and engagement with one of said guide portions on each journal box, a main frame supported by said equalizers and engaging the opposite guide portion of each journal box, and a bolster supported by said main frame.

2. In a railway car truck, the combination of spaced wheel and axle assemblies provided with journal boxes, said boxes having spaced vertically disposed flanges on opposite sides thereof providing guiding jaws, equalizers seated on said boxes and having engagement with jaws on one side thereof, and a main frame supported by said equalizers and having guiding relation with the jaws on the other side of said journal boxes.

3. In a railway car truck, the combination of spaced wheel and axle assemblies provided with journal boxes, each of said boxes having spaced flanges disposed on the top and opposite sides thereof providing a top depressed seating portion and side guiding jaws, equalizers seated on said depressed portions and having engagement with the jaws on one side of said journal boxes, and a main frame supported by said equalizers and having guiding relation with jaws on the other side of said journal boxes.

4. In a railway car truck, the combination of spaced wheel and axle assemblies provided with journal boxes having spaced flanges providing jaws on opposite sides thereof, equalizers seated on said boxes, a main frame resiliently supported on said equalizers, said main frame and equalizers being provided with jaws having engagement with said jaws on opposite sides of said journal boxes, and a bolster hung from said main frame.

5. In a railway car truck, the combination of spaced wheel and axle assemblies provided with journal boxes having spaced flanges providing jaws on opposite sides thereof, equalizers seated on said journal boxes, a main frame, coil springs between said main frame and equalizers for support of said frame on said equalizers, said main frame and equalizers having engagement with said guide jaws on opposite sides of said journal boxes, a bolster associated with said main frame, a spring plank hung from said main frame, and leaf spring assemblies between said plank and bolster for resiliently supporting the same.

6. In a railway car truck, the combination of spaced front and rear wheel and axle assemblies having journal boxes, said journal boxes having flanges providing guiding jaws, equalizers seating upon said journal boxes and engaging one of said jaws of each of said journal boxes, and a main frame supported on said equalizers and having guiding and wearing relation with the other of the jaws of each of said journal boxes, said journal boxes being symmetrical in construction for interchangeability between said front and rear wheel and axle assemblies upon wear.

7. In a railway car truck, the combination of spaced wheel and axle assemblies provided with journal boxes, equalizers extending between said assemblies, said equalizers being seated on said journal boxes and engaging jaws on the inside thereof, and a main frame supported by said equalizers and being provided with pedestals having guiding relation with the outer face only of said boxes, said outer face having jaws symmetrically disposed in respect to said first-named jaws whereby said boxes are interchangeable between said assemblies.

8. In a railway car truck, the combination of spaced wheel and axle assemblies provided with journal boxes, equalizers extending between said assemblies and being seated on said journal boxes, said equalizers comprising members formed with a top web, a main frame supported by said equalizers and having pedestals having guiding relation with said journal boxes, and tie members extending between said pedestals below the web of said equalizers for support thereof in case of failure.

9. In a railway car truck, the combination of spaced wheel and axle assemblies provided with journal boxes, equalizers extending between said assemblies and being seated on said journal boxes, said equalizers comprising members formed with a top web, a main frame supported by said equalizers and normally in spaced relation to said boxes, said main frame having pedestals having guiding relation with the outer face only of said boxes, and tie members extending in unsupported relation between and being connected to said pedestals below the web of said equalizers for support thereof in case of failure.

10. In a railway car truck, the combination of spaced wheel and axle assemblies provided with journal boxes, said boxes having substantially vertically disposed guiding jaws on the sides thereof, equalizers extending between said assemblies and being seated on said boxes, said equalizers engaging said guiding jaws on the inside of said journal boxes, and a truck frame member having pedestals having guiding and wearing relation only with said guiding jaws on the outside of said journal boxes, and tie members extending in unsupported relation between said assemblies and being connected to adjacent pedestals, said tie bars being disposed to support said equalizers upon failure and downward displacement thereof and said truck frame.

11. In a railway car truck, the combination of spaced wheel and axle assemblies having journal boxes, said journal boxes having guiding jaws, relatively movable truck members extending between said assemblies, one of said members engaging certain of the jaws of said journal boxes, and the other of said members having guiding and wearing relation with other of said jaws, said journal boxes being symmetrical in construction for interchangeability between said assemblies upon wear.

12. In a railway car truck, the combination of spaced wheel and axle assemblies having journal boxes, said journal boxes having substantially vertically disposed jaws on each side thereof, and relatively movable truck members extending between said assemblies, one of said members engaging jaws on one side of each of said journal boxes, and the other of said members having guiding and wearing relation with jaws on the other side of each of said journal boxes, said jaws on said journal boxes being symmetrical in construction whereby said journal boxes are interchangeable between said assemblies upon wear.

ALFRED H. OELKERS.